(12) United States Patent
Tokita et al.

(10) Patent No.: US 10,441,890 B2
(45) Date of Patent: Oct. 15, 2019

(54) GAME APPARATUS

(71) Applicant: KABUSHIKI KAISHA SQUARE ENIX, Tokyo (JP)

(72) Inventors: Takashi Tokita, Tokyo (JP); Masayoshi Soken, Tokyo (JP)

(73) Assignee: KABUSHIKI KAISHA SQUARE ENIX, Tokyo (JP)

( * ) Notice: Subject to any disclaimer, the term of this patent is extended or adjusted under 35 U.S.C. 154(b) by 0 days.

(21) Appl. No.: 16/026,679

(22) Filed: Jul. 3, 2018

(65) Prior Publication Data

US 2018/0318717 A1     Nov. 8, 2018

Related U.S. Application Data

(63) Continuation of application No. 15/615,008, filed on Jun. 6, 2017, now Pat. No. 10,039,986, which is a
(Continued)

(30) Foreign Application Priority Data

Jan. 18, 2012    (JP) ................................. 2012-008136

(51) Int. Cl.
    *A63F 13/213*     (2014.01)
    *A63F 13/77*      (2014.01)
    (Continued)

(52) U.S. Cl.
    CPC ............. *A63F 13/77* (2014.09); *A63F 13/52* (2014.09); *A63F 13/53* (2014.09);
(Continued)

(58) Field of Classification Search
    CPC ....................... A63F 13/213; A63F 2300/1087
See application file for complete search history.

(56) References Cited

U.S. PATENT DOCUMENTS 5,553,864 A *   9/1996   Sitrick ................... H04N 5/272
                                                                                     463/31
5,830,065 A     11/1998   Sitrick
(Continued)

FOREIGN PATENT DOCUMENTS

JP         2003-125042       4/2003
JP         2006-524060      10/2006
(Continued)

OTHER PUBLICATIONS

Office Action from Japan Patent Office (JPO) in Japanese Patent Application No. 2012-008136, dated Aug. 27, 2013.
(Continued)

*Primary Examiner* — Steven J Hylinski
(74) *Attorney, Agent, or Firm* — Greenblum & Bernstein, P.L.C.

(57) ABSTRACT

A game apparatus is provided which has a convenience where another function, such as photo taken by a camera, can be used while playing a game by causing a game program and another program to work together. The game apparatus increases interest of the game by relating a result of execution of the other program to the contents of the game. For example, when a camera icon displayed on a display is selected by an operation of a touch panel, a program for controlling a camera function launches, and an image can be captured at an arbitrary timing. The captured image is converted according to a predetermined condition. The converted image is displayed on a display screen and image data is stored in a flash memory.

6 Claims, 6 Drawing Sheets

Related U.S. Application Data continuation of application No. 13/688,506, filed on Nov. 29, 2012, now Pat. No. 9,700,800.

(51) Int. Cl.
    *A63F 13/53* (2014.01)
    *A63F 13/52* (2014.01)
    *H04M 1/725* (2006.01)

(52) U.S. Cl.
    CPC ... *H04M 1/72544* (2013.01); *A63F 2300/204* (2013.01); *A63F 2300/209* (2013.01); *A63F 2300/406* (2013.01); *A63F 2300/407* (2013.01); *A63F 2300/6009* (2013.01); *A63F 2300/695* (2013.01); *H04M 1/72561* (2013.01); *H04M 2250/52* (2013.01)

(56) References Cited

U.S. PATENT DOCUMENTS

| | | | |
|---|---|---|---|
| 6,036,601 A | 3/2000 | Heckel | |
| 6,283,858 B1 | 9/2001 | Hayes, Jr. et al. | |
| 6,285,381 B1 | 9/2001 | Sawano et al. | |
| 6,435,969 B1 | 8/2002 | Tanaka et al. | |
| 6,664,956 B1 | 12/2003 | Erdem | |
| 6,749,514 B1 | 6/2004 | Moriwaki et al. | |
| 6,811,492 B1 | 11/2004 | Arakawa et al. | |
| 7,155,260 B2 | 12/2006 | Tanaka et al. | |
| 7,313,276 B2 | 12/2007 | Simelius et al. | |
| 7,597,622 B2 | 10/2009 | Takase | |
| 7,819,731 B2 | 10/2010 | Suzuki | |
| 7,828,656 B2 | 11/2010 | Paulsen et al. | |
| 8,152,637 B2 | 4/2012 | Watanabe et al. | |
| 8,202,167 B2 | 6/2012 | Ackley et al. | |
| 8,231,465 B2 | 7/2012 | Yee et al. | |
| 8,512,144 B2 | 8/2013 | Johnson et al. | |
| 8,684,837 B2 | 4/2014 | Kitahara | |
| 8,747,222 B2 | 6/2014 | Yamashita | |
| 9,149,715 B2 | 10/2015 | Abe et al. | |
| 9,292,310 B2 | 3/2016 | Chaudhri et al. | |
| 2002/0079370 A1* | 6/2002 | Wood | G06K 7/10722 235/454 |
| 2002/0082082 A1 | 6/2002 | Stamper et al. | |
| 2003/0035013 A1 | 2/2003 | Johnson | |
| 2003/0073466 A1 | 4/2003 | Tanaka et al. | |
| 2003/0100363 A1 | 5/2003 | Ali | |
| 2004/0127284 A1 | 7/2004 | Walker et al. | |
| 2004/0268381 A1 | 12/2004 | Simelius et al. | |
| 2005/0233769 A1 | 10/2005 | Tanaka et al. | |
| 2006/0030371 A1 | 2/2006 | Tanaka et al. | |
| 2006/0046817 A1 | 3/2006 | Paulsen et al. | |
| 2006/0079324 A1 | 4/2006 | Watanabe et al. | |
| 2006/0223635 A1 | 10/2006 | Rosenberg | |
| 2007/0067743 A1 | 3/2007 | Tanaka et al. | |
| 2008/0158230 A1* | 7/2008 | Sharma | G06T 13/40 345/473 |
| 2009/0082095 A1 | 3/2009 | Walker et al. | |
| 2009/0153567 A1 | 6/2009 | Jung | |
| 2009/0252435 A1* | 10/2009 | Wen | G06K 9/00228 382/284 |
| 2010/0157084 A1* | 6/2010 | Shimamura | G06K 9/00228 348/222.1 |
| 2010/0182447 A1* | 7/2010 | Namba | G02B 7/28 348/222.1 |
| 2010/0248825 A1 | 9/2010 | Toyoda | |
| 2010/0255900 A1 | 10/2010 | Ansari | |
| 2011/0028207 A1 | 2/2011 | Gagner et al. | |
| 2011/0123118 A1* | 5/2011 | Nayar | G06T 11/60 382/190 |
| 2011/0167383 A1 | 7/2011 | Schuller et al. | |
| 2011/0167393 A1 | 7/2011 | Tanaka et al. | |
| 2012/0075503 A1* | 3/2012 | Akifusa | H04N 5/23219 348/231.99 |
| 2012/0092328 A1 | 4/2012 | Flaks et al. | |
| 2012/0094773 A1* | 4/2012 | Suzuki | A63F 13/655 463/43 |
| 2012/0154557 A1 | 6/2012 | Perez et al. | |
| 2012/0250943 A1 | 10/2012 | Aomi | |
| 2014/0219500 A1* | 8/2014 | Moehrle | G06F 19/321 382/103 |

FOREIGN PATENT DOCUMENTS

| | | |
|---|---|---|
| JP | 2007-081503 | 3/2007 |
| JP | 2010-246650 | 11/2010 |

OTHER PUBLICATIONS

"TECMO Player's Mag", TECMO Co., Ltd., vol. 026, p. 16, dated Sep. 27, 2004, together with a partial English language translation.
"Dengeki PlayStation", Media Works, Inc., vol. 283, p. 245, dated Sep. 24, 2004, together with a partial English language translation.
Office Action from Japan Patent Office (JPO) in Japanese Patent Application No. 2012-008136, dated Nov. 12, 2013, along with an English language translation thereof.
Extended European Search Report (EESR) from European Patent Office (EPO) in European Patent Application No. 12193917.7, dated Aug. 18, 2014.
SmartKeitai, "FatBooth for Android", XP054975456, Retrieved from URL: http://www.youtube.com/watch?v=KsycQ53En3U, Retrieved on Jul. 17, 2014 (Mar. 16, 2011).
Anonymous, "Taking Photos Simply Android Developers", XP055128986, Retrieved from URL: http://devloper.android.com/training/camera/photobasics.html, Retrieved on Jul. 15, 2014 (Jan. 4, 2012).
Anonymous, "android—How to select a piece of an image to set the avatar—Stack Overflow", XP055129294, Retrieved from URL: http://stackoverflow.com/questions/7827819/how-to-select-a-piece-of-an-image-to-set-the-avatar, Retrieved on Jul. 16, 2014 (Oct. 19, 2011).
Lars Vogel, "Android Intents—Tutorial", XP055129177, Retrieved from URL: https://web.archive.org/web/20120116035254/http://www.vogella.de/articles/AndroidIntent/article.html, Retrieved on Jul. 15, 2014 (Jan. 16, 2012).

* cited by examiner

[Fig. 1]
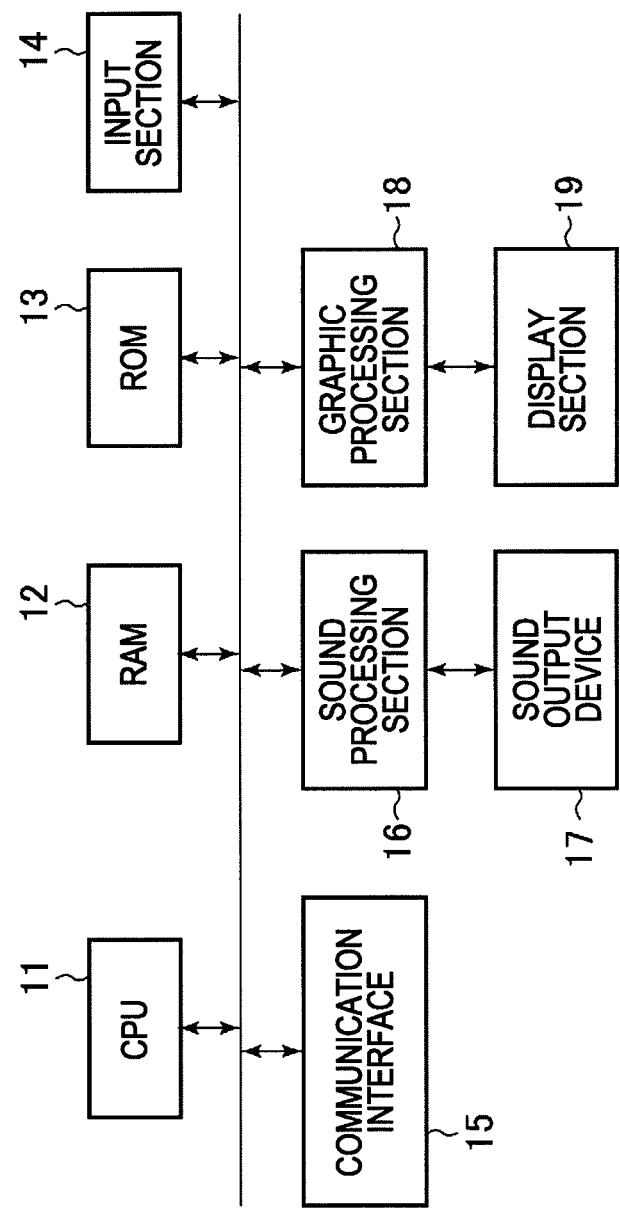

[Fig. 2]
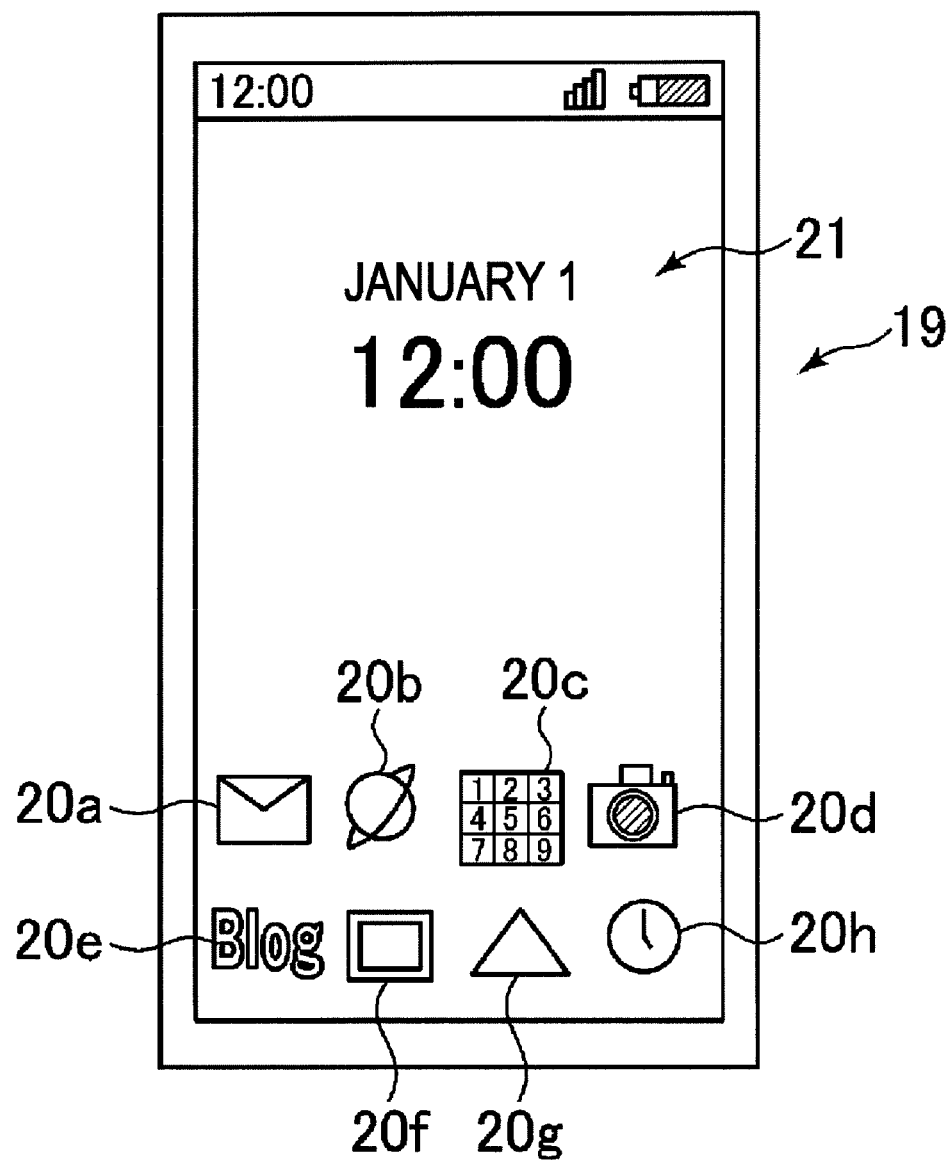

[Fig. 3]
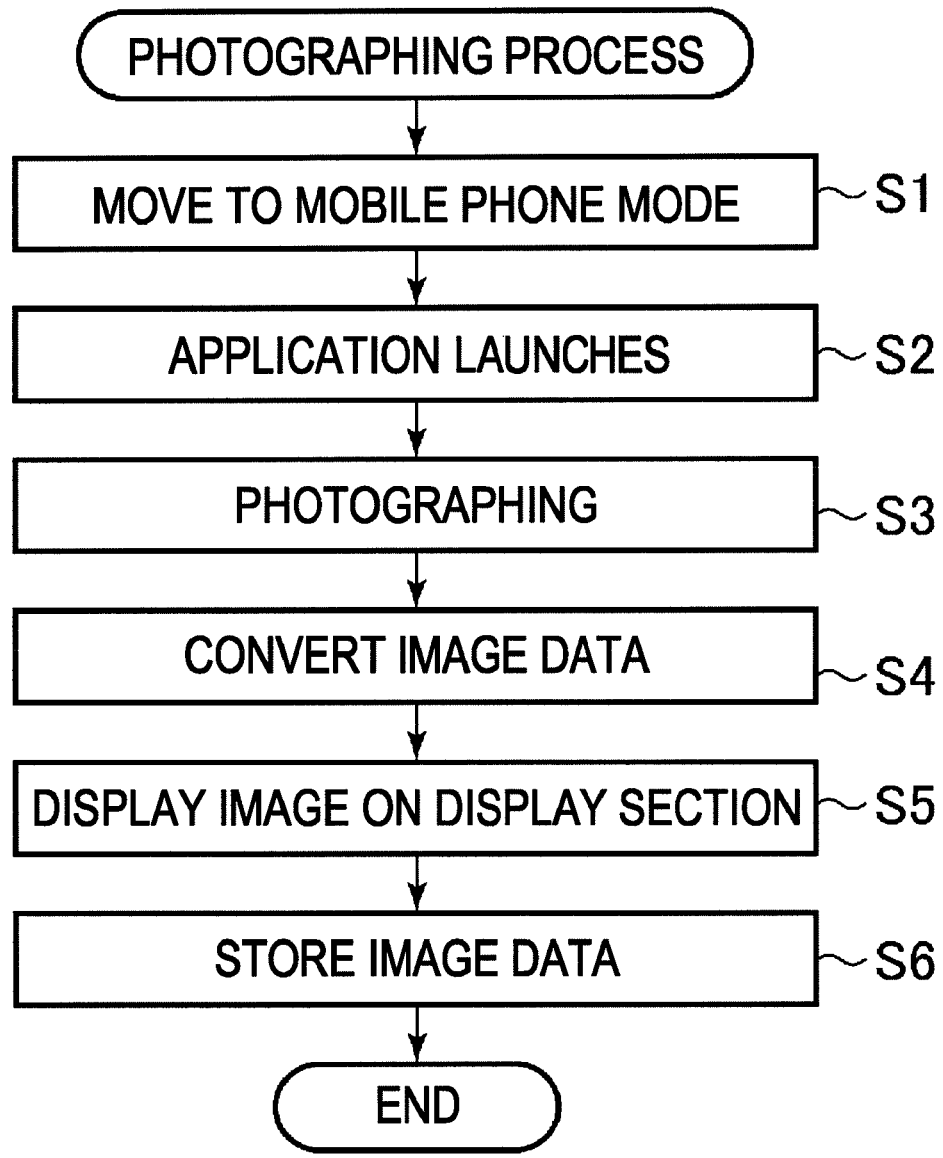

[Fig.4a] [Fig. 4b]
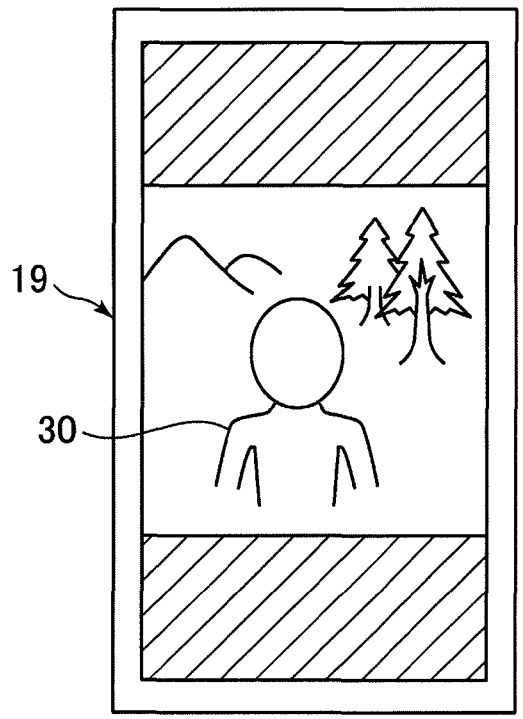
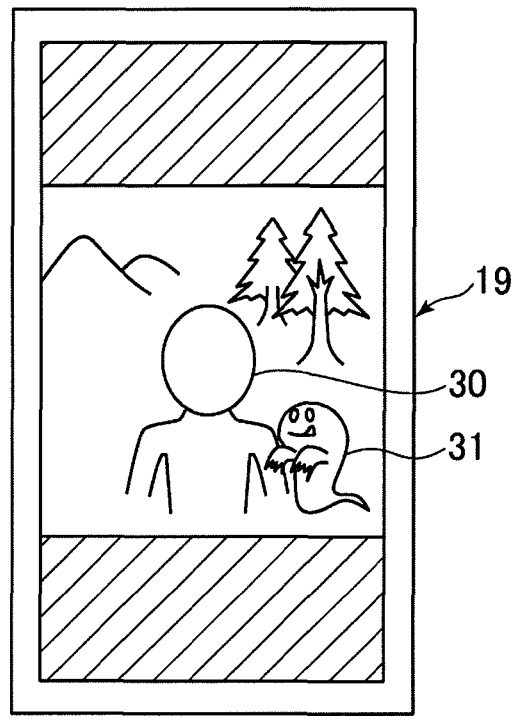

[Fig. 5]
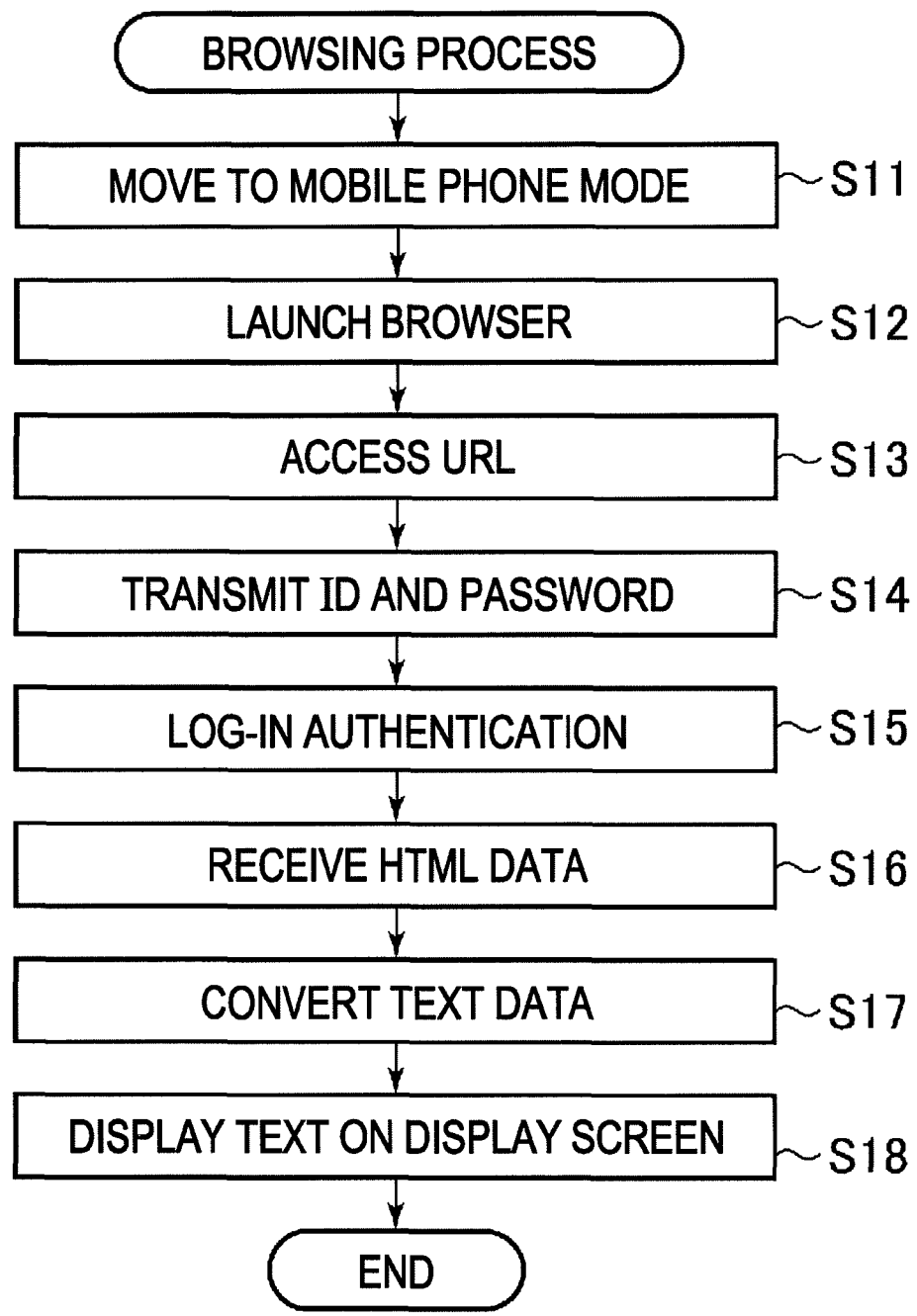

[Fig. 6a]
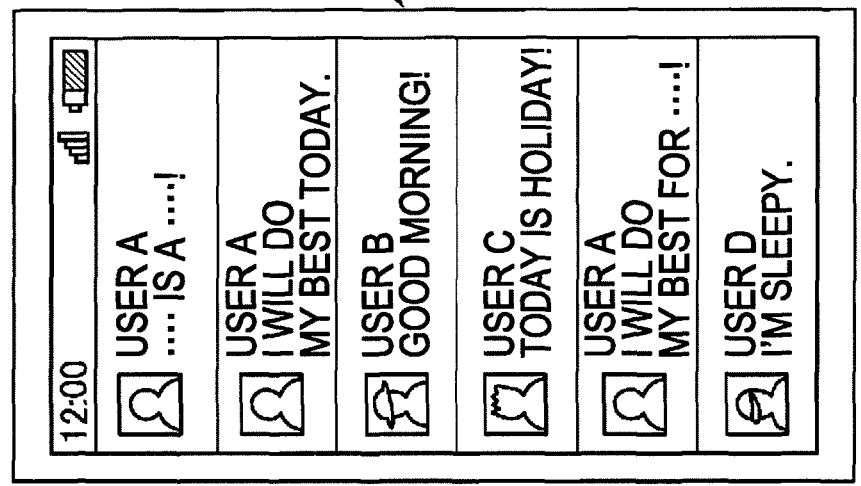
[Fig. 6b]
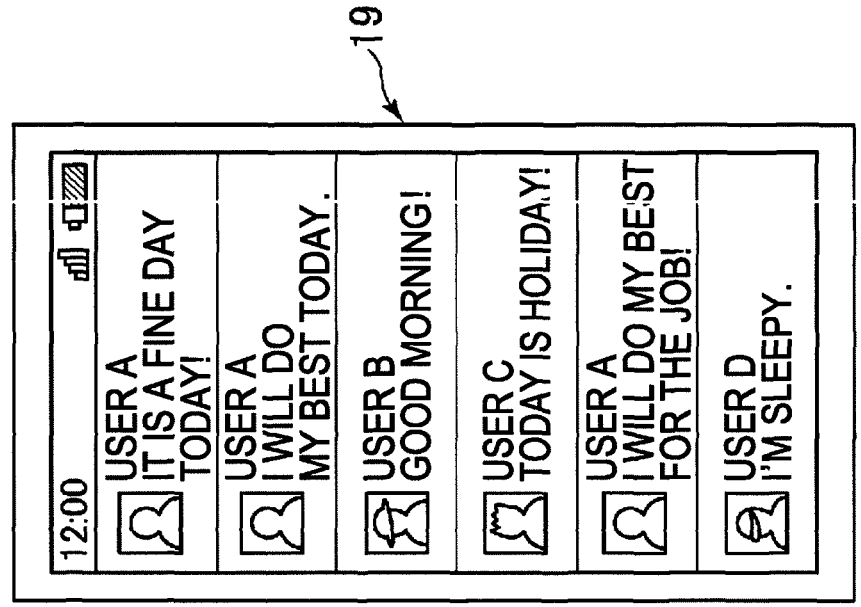

GAME APPARATUS

CROSS-REFERENCE TO RELATED APPLICATION

The present application is a continuation application of U.S. patent application Ser. No. 15/615,008, filed Jun. 6, 2017, which is a continuation application of U.S. patent application Ser. No. 13/688,506, filed Nov. 29, 2012 and now U.S. Pat. No. 9,700,800 issued on Jul. 11, 2017, which claims the benefit of Japanese Patent Application No. 2012-008136, filed on Jan. 18, 2012. The entire disclosure of each of the above-identified applications, including the specification, drawings, and claims, is incorporated herein by reference in its entirety.

BACKGROUND OF THE INVENTION

1. Field of the Invention

The present invention relates to a game apparatus which increases interest of a game by causing a game program and another application program to work together.

2. Description of the Related Art

In recent years, smartphones that have not only a function of a normal mobile phone but also a function to connect to the Internet and play video, and portable tablet computers including a touch panel type input unit are widely used. In the smartphones and the tablet computers, application software (hereinafter referred to as "application") having various functions such as transmitting and receiving emails, connecting to the Internet, capturing sound and image by a camera, and playing a game is installed and a user can use various applications.

By the way, these applications are used individually by using their own interfaces and an application does not work together with other applications. For example, although it is proposed that image data acquired in advance is used in a game (for example, see Japanese Patent Application Laid-Open No. 2010-246650), it is not so useful because the image data needs to be acquired before starting the game by using an application that controls a camera to capture an image. Further, even if image data captured by a camera can be used in a game, the image data need not be related to the contents of the game, so that it is not so interesting.

SUMMARY OF THE INVENTION

An object of the present invention is to provide a game apparatus which has a convenience where another function such as photo taking by a camera can be used while playing a game by causing a game program and another application program to work together and which increases interest of the game by relating a result of execution of the application program to the contents of the game.

In accordance with a first aspect of the present invention, a game apparatus includes a program storage that stores a game program and another application program different from the game program; a program launcher that launches the application program stored by the program storage while the game program is being executed; a program executor that executes the application program launched by the program launcher; a data converter that converts data, which is obtained by executing the application program by the program executor, according to a predetermined condition; and a first displayer that displays an image corresponding to the data converted by the data converter on a display screen.

In the present invention, while the game is being played, another application different from the game program can be launched and used. An application used in the real life by using a smartphone or the like can also be used in the game and data obtained by the application can be converted according to the feeling of the game world, so that it is possible to give a feeling as if events in the game were actually occurring to the player.

Preferably the game apparatus in accordance with the first aspect of the invention includes a second displayer that displays an icon for launching the application program on the display screen; and an icon selection receptor that receives a selection of an icon by an operation instruction by a player, wherein the program launcher launches the application program when the selection of the icon is received by the icon selection receptor.

In the present invention, when the game program is launched, a screen similar to a standby screen (desktop screen) of a smartphone or the like is displayed and it is possible to request launch of an application that can use a camera function or connect to the Internet by a touch operation to the screen. Therefore, even in a setting in which a smartphone or the like is operated in the game, it is possible to give a feeling as if a player operated the smartphone or the like in the real world to the player, so that it is possible to add more reality to the events in the game.

In accordance with a second aspect of the present invention, a game apparatus including a camera function, the game apparatus includes a program storage that stores a game program and a camera program for controlling photographing using the camera function; a camera program launcher that launches the camera program stored by the program storage while the game program is being executed; a photographing executor that executes photographing by the camera program launched by the camera program launcher; an image data converter that converts image data, which is obtained by the photographing executor, according to a predetermined condition; and a displayer that displays an image corresponding to the image data converted by the image data converter on a display screen.

In the present invention, while the game is being played, photographing can be performed by a camera. Image data obtained by the photographing can be converted according to the feeling of the game world, so that it is possible to give a feeling as if the events in the game were actually occurring to the player. For example, in a case of a horror adventure game, even when an image in the real world is photographed by using a camera function, the obtained image is converted into horror image data, so that it is possible to increase a sense of fear felt during play of the game.

In accordance with a third aspect of the present invention, a game apparatus which can connect and communicate with a communication network, the game apparatus includes a program storage that stores a game program and a web browser; a web browser launcher that launches the web browser while the game program is being executed; a data transmit-receiver that executes the web browser launched by the web browser launcher and transmits and receives text data to and from a predetermined server connected and communicated with a computer apparatus; a text data converter that converts text data, which is obtained by the transmit-receiver, according to a predetermined condition; and a displayer that displays an image corresponding to the text data converted by the text data converter on a display screen.

In the present invention, while the game is being played, a web site can be browsed. Data transmitted from the web site can be converted according to the feeling of the game world, so that it is possible to give a feeling as if the events in the game were actually occurring to the player. For example, in a case of a horror adventure game, even when a micro-blog posting site is browsed, contents that can be browsed is converted into horror contents, so that it is possible to increase a sense of fear felt during play of the game.

In accordance with a fourth aspect of the present invention, a game program executed by a computer apparatus in which another application program different from the game program is stored, the game program causes the computer apparatus to function as a program launcher that launches the application program while the game program is being executed; a program executor that executes the application program launched by the program launcher; a data converter that converts data, which is obtained by executing the application program by the program executor, according to a predetermined condition; and a displayer that displays an image corresponding to the data converted by the data converter on a display screen.

In accordance with a fifth aspect of the present invention, a game program which is executed by a computer apparatus which includes a camera function and which stores a camera program for controlling photographing using the camera function, the game program causes the computer apparatus to function as a camera program launcher that launches the camera program while the game program is being executed; a photographing executor that executes photographing by the camera program launched by the camera program launcher; an image data converter that converts image data, which is obtained by the photographing executor, according to a predetermined condition; and a displayer that displays an image corresponding to the image data converted by the image data converter on a display screen.

In accordance with a sixth aspect of the present invention, a game program executed by a computer apparatus which can be connected and communicated with a communication network and which includes a web browser, the game program causes the computer apparatus to function as a web browser launcher that launches the web browser while the game program is being executed; a data transmit-receiver that executes the web browser launched by the web browser launcher and transmits and receives text data to and from a predetermined server connected and communicated with the computer apparatus; a text data converter that converts text data, which is obtained by the transmit-receiver, according to a predetermined condition; and a displayer that displays an image corresponding to the text data converted by the text data converter on a display screen.

BRIEF DESCRIPTION OF THE DRAWINGS

FIG. 1 is a block diagram showing a configuration of a game apparatus according to an embodiment of the present invention;

FIG. 2 is a diagram showing an example of a display screen of the game apparatus according to the embodiment of the present invention;

FIG. 3 is a diagram showing a flowchart of a photographing process of the game apparatus according to the embodiment of the present invention;

FIGS. 4a and 4b are diagrams showing an example of a display screen of the game apparatus according to the embodiment of the present invention;

FIG. 5 is a diagram showing a flowchart of a web site browsing process of the game apparatus according to the embodiment of the present invention; and FIGS. 6a and 6b are diagrams showing an example of a display screen of the game apparatus according to the embodiment of the present invention.

DETAILED DESCRIPTION OF EMBODIMENTS

Hereinafter, an embodiment of the present invention will be described with reference to the drawings. FIG. 1 is a block diagram showing a configuration of a mobile terminal (game apparatus) applied in the embodiment. Examples of the mobile terminal of the present invention include mobile terminals such as a smartphone and a tablet type computer which are controlled by an OS (operating system). The mobile terminal includes a CPU (Central Processing Unit) 11, a RAM 12, a ROM 13, an input section 14, a communication interface 15, a sound processing section 16, a sound output device 17, a graphic processing section 18, and a display section 19.

The CPU 11 executes a program stored in the ROM 13 and controls the entire apparatus. The RAM 12 is a work area of the CPU 11. Information necessary to proceed with a game is temporarily stored in the RAM 12. The ROM 13 is used as a storage area to store programs and data. The ROM 13 includes a flash memory.

The input section 14 includes an operation button on a main body of the mobile terminal and a touch panel on the display section 19. Input information inputted from the input section 14, such as pressing the operation button or a touch operation to the touch panel by a player, is stored in the RAM 12. The CPU 11 performs various calculation processes on the basis of the input information.

The communication interface 15 can connect to a communication network by radio. The communication interface 15 can communicate with another game apparatus by radio through a communication unit including an antenna.

The CPU 11 processes a program and data loaded into the RAM 12, outputs an instruction for outputting sound to the sound processing section 16, and outputs a drawing instruction to the graphic processing section 18. The sound processing section 16 is connected to the sound output device 17, which is a speaker. When the CPU 11 outputs the instruction for outputting sound to the sound processing section 16, the sound processing section 16 outputs a sound signal to the sound output device 17.

The graphic processing section 18 is connected to the display section 19. When the drawing instruction is outputted from the CPU 11, the graphic processing section 18 outputs a video signal that displays an image on a display screen of the display section 19. One frame time of an image included in the video signal outputted from the graphic processing section 18 is, for example, 1/30 second. The graphic processing section 18 draws an image for each frame unit (for example, for each 1/30 second).

An outline of the game according to the embodiment of the present invention will be described. The game of the present invention includes a main game that is a main part of the game such as a role-playing game (RPG), an action game, and an adventure game and a mobile phone mode in which a player character operated by a player operates a mobile phone in the game.

In the main game, the game progresses while the player character moves in a virtual space to solve a problem given in the game. The player can operate the touch panel from the main game to open a menu screen and move to the mobile phone mode.

FIG. 2 is an example of a display screen of the game apparatus according to the embodiment of the present invention. In the mobile phone mode, a screen, which is similar to a desktop screen displayed after a smartphone or a tablet type computer is started, can be displayed as a display screen of the display section 19. Even in the game, a feeling as if being in a real world can be given to the player.

In the mobile phone mode, for example, the current date and time is correctly displayed in a date and time display area 21 at an upper middle portion of the display screen. Also, an icon 20a for launching a mailer, an icon 20b for launching a browser to connect to the Internet, an icon 20c for making a phone call, an icon 20d for capturing an image by a camera, an icon 20e for connecting to a micro-blog posting site, and the other icons 20f to 20h are displayed. It is also possible to form a configuration for actually launching a mailer or connecting to the Internet by selecting the icons 20a to 20f by a touch operation of the player to the touch panel. Also, it is possible to form a configuration in which the icons 20 are only displayed and cannot be selected and when an icon 20 is selected, a play of a mini-game whose contents are related to the icon can be started.

First, a case will be described in which an image is captured by a digital camera function in the mobile phone mode. FIG. 3 is a diagram showing a flowchart of a photographing process according to the embodiment of the present invention. First, by a touch panel operation of the player, a mode changes from the main game to the to the mobile phone mode (step S1). Next, when the player operates the touch panel to select the camera icon 20d displayed on the display screen of the display section 19, an application for controlling the camera function launches (step S2), and an image can be captured by the camera function installed in the game apparatus. On the display screen of the display section 19, circumstances of the real world captured by a photographic lens mounted in the game apparatus are displayed.

When the player presses the operation button in the input section 14 at an arbitrary timing, the circumstances of the real world are captured by an image sensor (step S3). The image data captured in step S3 is converted according to a predetermined condition (step S4). On the basis of the converted image data, a converted image is displayed on the display screen of the display section 19 (step S5) and stored in the flash memory of the ROM 13 (step S6).

The image which is converted and stored in the flash memory can be browsed by selecting an icon corresponding to an application for browsing an image in the mobile phone mode in the game or can be browsed by launching an application for normally browsing an image after completing the game.

Although the conversion method of the image data in step S4 is not particularly limited, for example, the conversion is performed by replacing an image data of a predetermined area by an image data of the character appearing in the game. FIGS. 4a and 4b are diagrams showing an example of the display screen of the game apparatus and show a relationship between before and after the conversion of the image data. FIG. 4a shows the image data captured in step S3, in which a player 30 is displayed in the center of the screen of the display section 19. FIG. 4b shows the image data converted in step S4, in which not only the player 30 is displayed in the center of the screen, but also a horror image 31 is displayed to the right of the player.

When the category of the game is a horror adventure game, as shown in FIG. 4b, a character including a horror factor is displayed in a part of the image. However, an image to be pasted can be appropriately adjusted according to the category of the game. In step S4, a plurality of images to be pasted may be prepared and an image to be pasted may be appropriately determined according to the progress of the game. The size and the position of the image to be pasted are arbitrarily adjusted.

In addition, examples of the image data conversion method in step S4 includes a method in which all the image data is converted from a color image to a monochrome image and a method in which an area where a face of a subject person is identified by using a face recognition system and the area is replaced by an image of a predetermined character.

Next, a case will be described in which a web site is browsed in the mobile phone mode 200. Although there is no limitation about web sites to which the present invention can be applied, here, a case in which a micro-blog posting site is browsed will be described. FIG. 5 is a diagram showing a flowchart of a web site browsing process of the game apparatus according to the embodiment of the present invention.

First, by a touch panel operation of the player, a mode changes from the main game to the mobile phone mode (step S11). Next, when the player operates the touch panel to select a micro-blog icon 20e displayed on the display screen, a browser launches (step S12) and the browser accesses the URL of the micro-blog posting site (step S13). An ID and a password for identifying a user (player) are required to log in to the micro-blog posting site and when the ID and the password are inputted and transmitted to a web server which is a delivery source of the micro-blog posting site (step S14), the log-in is authenticated (step S15).

The type of the micro-blog posting site is not particularly limited. For example, the micro-blog posting site is a site where contents posted by a plurality of users can be browsed as a list. In the micro-blog posting site, postings of a plurality of users, which are registered in advance for a player who logs in to the micro-blog posting site to be able to browse the posted contents, are displayed in chronological order. When the log-in to the micro-blog posting site is authenticated in step S15, HTML data for displaying the micro-blog posting site is received by the game apparatus (step S16).

In the game apparatus, a part or all of text data posted by a user in the received HTML data is converted by a predetermined method (step S17) and the converted text data is displayed on the display screen (step S18). The conversion method of the text data posted by the user is not particularly limited, and for example, in a case of a horror adventure game, a method can be used in which numbers, alphabets, hiraganas, katakanas, and special symbols (-, [,], ?, !, *, punctuation marks, and the like) are not converted and the other characters are converted into "• • • ". For example, when "It is a fine day today!" is posted from the user, "• • • is a • • • !" is displayed, so that the player cannot understand the posted content, and thus it is possible to cause a sense of fear.

In the conversion of the text data in step S17, it is not necessary to convert all the postings displayed in the micro-blog posting site and only a part of the posted content may be converted. For example, the number of postings to be converted may vary according to the progress of the main game. In a scene when a sense of fear is heightened in the main game, if the number of the postings to be converted at the timing of the scene is increased, the sense of fear can be further heightened.

FIGS. 6a and 6b are diagrams showing an example of the display screen of the game apparatus and also diagrams showing an example when the micro-blog posting site is browsed. FIG. 6a shows an appearance of the micro-blog posting site when the text data is not changed. FIG. 6b shows an appearance of the micro-blog posting site after the text data is changed. In FIG. 6b, the postings of a user A, which are displayed in the first and the fifth fields from the above, are changed and displayed.

In the above embodiment, a case is described in which the present invention is applied to a horror adventure game. However, the category of the game to which the present invention is applied is not limited. For example, the present invention can be applied to a normal action game, a shooting game, a RPG, a fighting game, a sports game, and the like. The image data and the text data are changed so that the feeling of each game world is reflected.

REFERENCE SIGNS LIST

11 CPU
12 RAM
13 ROM
14 INPUT SECTION
15 COMMUNICATION INTERFACE
16 SOUND PROCESSING SECTION
17 SOUND OUTPUT DEVICE
18 GRAPHIC PROCESSING SECTION
19 DISPLAY SECTION
20 ICON
30 PLAYER
31 HORROR IMAGE

What is claimed is:

1. An apparatus, comprising:
a camera function;
a memory that stores a first program and a second program;
a central processor that:
identifies a predetermined area from first image data, which is obtained by using the camera function, by executing the second program while the first program is being executed; and
generates second image data which is changed from an image included in the identified predetermined area to a predetermined image; and
a graphics processor that displays the second image data on a display screen,
wherein the second image data is displayed on the display screen by the graphics processor in response to an object, for browsing the second image data, being selected by a user while the first program is being executed.

2. The apparatus according to claim 1, wherein
the second program stored by the memory is a face recognition program for recognition of a face of a person by using the camera function, and
the central processor identifies an area corresponding to a recognized face as the predetermined area.

3. The apparatus according to claim 1, wherein
the memory further stores at least third image data for generating the second image data by the central processor, and
the predetermine image in generating the second image data corresponds to the stored third image data.

4. The apparatus according to claim 1, wherein
the predetermined image is an image of a predetermined character.

5. The apparatus according to claim 1, wherein
a number of predetermined areas which is identified, and images included in the identified predetermined areas which are changed to predetermined images, varies according to a progress of the first program.

6. A non-transitory computer-readable medium including a first program executed by a computer apparatus which is provided with a camera function and in which a second program is stored, the first program causing the computer apparatus to execute:
identifying, by a central processor, a predetermined area from first image data, which is obtained by using the camera function, by executing the second program while the first program is being executed;
generating, by the central processor, second image data which is changed from an image included in the identified predetermined area to a predetermined image; and
displaying, by a graphics processor, the second image data on a display screen,
wherein the second image data is displayed on the display screen by the graphics processor in response to an object, for browsing the second image data, being selected by a user while the first program is being executed.

* * * * *